March 16, 1943. T. A. WETTIG 2,314,314
TOOL HOLDER
Filed Aug. 1, 1940
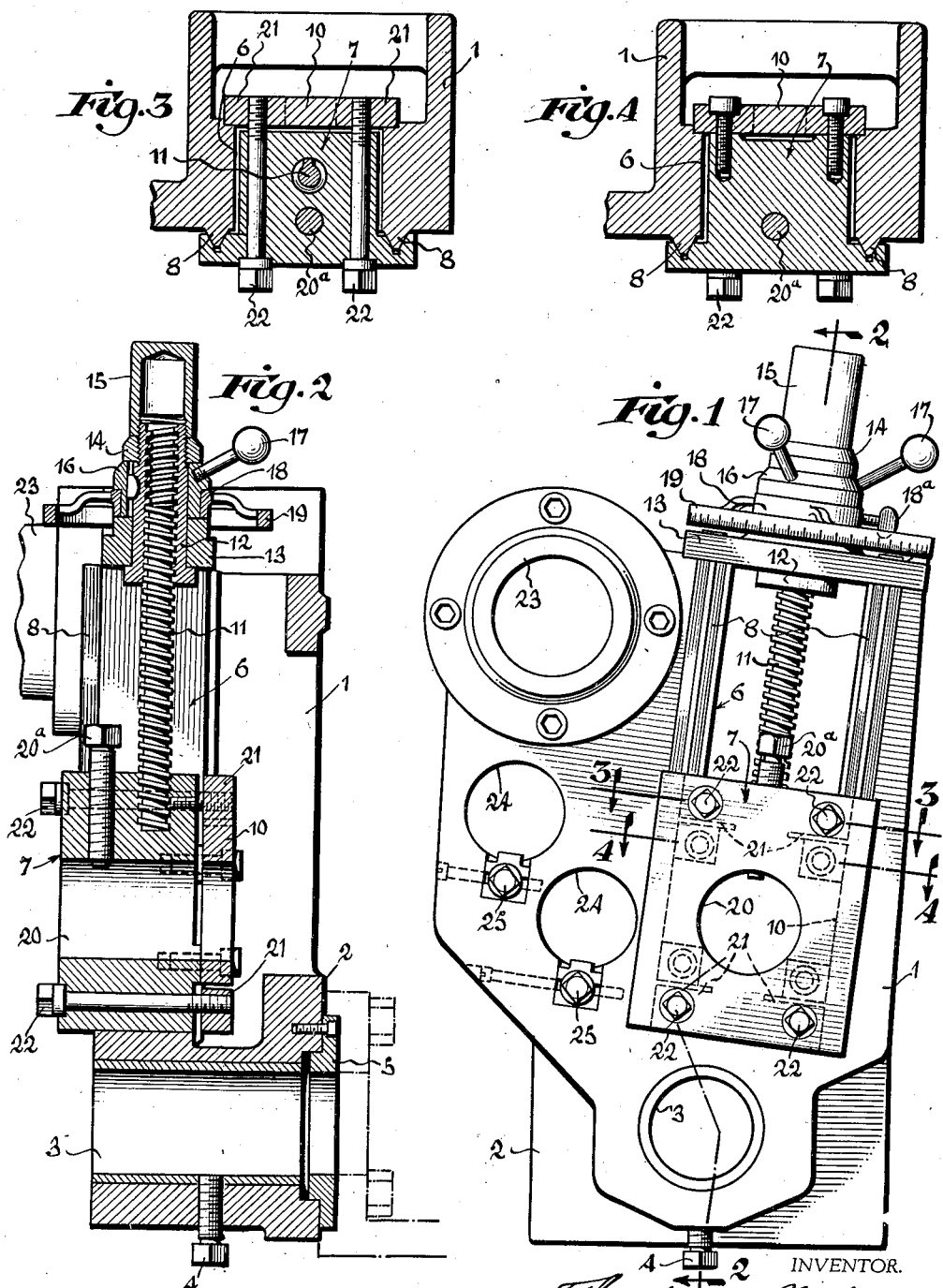
INVENTOR.
Theodore A. Wettig
BY Oliver B. Kaiser
ATTORNEY.

Patented Mar. 16, 1943

2,314,314

UNITED STATES PATENT OFFICE 2,314,314

TOOLHOLDER

Theodore A. Wettig, Cincinnati, Ohio, assignor to The Acme Machine Tool Company, Cincinnati, Ohio, a corporation of Ohio Application August 1, 1940, Serial No. 349,362

3 Claims. (Cl. 29—57)

This invention relates to improvements in multiple or plural tool holders, adapted primarily for mounting upon a turret of a machine tool.

An object of the invention is to provide a multiple tool holder for application upon a turret of a machine tool with diversified tool mountings in compact grouping, either respectively micrometrically adjustable or non-adjustable, and in a fixed location.

Another object of the invention is to provide a multiple tool holder for a machine tool, comprising a perpendicular body, with a portion having a tool holding slide adjustably mounted thereon, and with a plurality of openings adjacent the slide for receiving and mounting a tool or tool holder, and adapting all tools or tool holders to project from the same side of the body in a particular group arrangement.

Various other features and advantages of the invention will be more fully apparent from a description of the accompanying drawing, in which:

Figure 1 is a front elevation of the tool holder fixture with the tool slide adjusted to its lowermost position.

Figure 2 is a sectional view of the same, taken on line 2—2, Figure 1.

Figure 3 is a cross section taken on line 3—3, Figure 1.

Figure 4 is a section taken on line 4—4, Figure 1.

Referring to the drawing, the tool holder comprises a body 1 as a bracket, having a flange 2 at its rear side and lower end for attaching the body to the face of a turret of a machine tool, sustaining the body in a vertical position. The lower end of the body, centrally thereof, has a bushed opening 3 therethrough, for receiving and mounting a tool or tool holder with the shank thereof secured in place by a set-screw 4. The opening at the rear side of the body is in registry with an opening through a face wall of the turret of the machine tool or support to which the holder is applied.

A counterturned plate 5, shown in Figure 2, as a hub extension, is fixed to the rear side of the body having its front reduced diameter portion accurately recessed within the body, and the rear protruding portion engages accurately within an opening in the face wall of the turret. The plate may be formed integral with the body, and provides a convenient means for locating the body upon the face wall of the turret and assists in stabilizing the same thereon.

The body of the holder above the lower turret attaching end portion has a longitudinal opening 6 therethrough to provide a way for recessing therein the body portion of a tool carrying slide 7. Longitudinally with the opening, at opposite sides thereof and integrally projected from the front face of the body, a pair of parallel guide rails 8, 8, preferably of V-shape in cross section, are provided for slidably supporting the slide 7.

The slide has flanges projected from each of its opposite sides, to overlie and bear upon the rails. The underside of the flanges is grooved to engage with the rails. The rear side of the slide has a plate 10 fixed thereto and in bearing contact with the rear side of the body, bridging the opening 6 for the slide and slightly recessed into the rear face of the body. The slide at its upper end connects with an end of a screw 11 extending or depending from and in threaded engagement with a sleeve nut 12 journalled within a supporting or cross head 13 fixed to or integral with the body at the upper end of the rails and spanning the opening 6 in the body.

The lower end of the sleeve nut is flanged to provide a shouldered engagement with the cross head 13, and its opposite end is of reduced diameter and threaded to receive a lock nut 14 and a cap 15. The sleeve nut 12 has a hand wheel fixed thereto, composed of a collar 16 keyed to the sleeve and interposed between the cross head 13 and lock nut 14 provided with a plurality of handles 17 extending angularly therefrom for manually rotating the sleeve nut to translate or adjust the slide. The collar 16 of the hand wheel has the hub 18 of a gauge or dial ring 19 recessed therein, the periphery of the ring bearing suitable graduations and indicia for indicating the degree of slide adjustment or regulation. The gauge or dial ring is locked or fixed to the collar 16 of the hand wheel by a set-screw 18a. The feed mechanism of the slide, above described, is of conventional type.

The slide is provided centrally thereof with a tool or tool holder receiving opening 20, provided with a set-screw 20a for locking the tool or tool holder in place. While the tool holding slide normally is adjustable, provision is also made for immovably clamping the slide to the body in any adjustable or set position. This is accomplished by relieving a portion of the plate 10 at its opposite sides and ends by transverse slits providing opposite end sections 21, each in threaded connection with a screw 22 traversing the slide, with the head end of the screws accessible from and bearing against the front face of the slide, whereupon upon tightening the screws, the end sections are brought into binding engagement with the bracket, rigidly clamping the slide to the rails.

The body at its upper end adjacent the tool holding slide has an opening therethrough registering with the opening of a flange collar 23 fixed to the front side of the body for receiving and extending a pilot bar therethrough projecting from the head-stock of the lathe. The body between the pilot bar collar 23 and tool receiving opening 3 has a pair of apertures 24, 24, therethrough. Each aperture or opening is provided with a conventional type of frictional tool clamp 25.

In the present instance, the tool holder as a unit provides for holding four tools and a pilot bar, one mounted on the slide movable by the feed screw, a second directly on the body immediately beneath the slide and in accurate registry with plate 5, and a third and fourth directly in the body relatively off-set and adjacent the slide and beneath the pilot bar opening. A plurality of tools thus can be relatively compactly arranged upon the holder, and may be either of the same or different character as for boring, reaming, facing, or other metal cutting operations, of particular advantage in machining work, in which the machining must be done with the various types of tools as well as permitting several tools to be active at the same time.

Having described my invention, I claim:

1. A tool holder, comprising: a bracket supporting a plurality of tools for application to a turret of a machine tool having an elongated opening therethrough for receiving and mounting a tool carrying slide, a pair of parallel V-shaped rails on the front face of the bracket at opposite sides of said slide opening and longitudinally thereof for vertically guiding and supporting the slide, a slide having its body portion recessed within said opening and overlapping said rails and in bearing contact therewith, a plate fixed to the rear side of the body of said slide for mounting the slide upon the bracket, said plate bifurcated at relative opposite sides and ends, to provide yieldable sections adapted to be brought in binding contact with the bracket for rigidly clamping the slide to the bracket, and a screw respectively for each section traversing the slide and connecting with the section, to bring the same into binding contact with the bracket, and means carried by the bracket connecting with the slide for adjusting the same.

2. A tool holder, comprising: a bracket supporting a plurality of tools for application to a turret of a machine tool having an elongated opening therethrough for receiving and mounting a tool carrying slide, a pair of parallel V-shaped rails on the front face of the bracket at opposite sides of said slide opening and longitudinally thereof for vertically guiding and supporting the slide, a slide having its body portion recessed within said opening and overlapping said rails, and provided with V-shaped grooves for seating upon the rails, a plate fixed to the rear side of the body of said slide in sliding engagement with the bracket for mounting the slide upon the bracket, the slide having a plurality of raised areas adapted for mounting said plate in spaced relation therewith, said plate bifurcated at relative opposite sides and ends adjacent said raised areas to provide yieldable sections adapted to be brought in binding contact with the bracket for rigidly clamping the slide to the bracket, and a screw respectively for each section traversing the slide and connecting with the section to bring the same into binding contact with the bracket, and means carried by the bracket connecting with the slide for adjusting the same.

3. A tool holder, comprising: a body formed at one end for application to a turret of a machine tool and having a longitudinal opening therethrough to provide a slide-way for the reception of a tool carrying slide adjustable radially from the body connection with the turret and having a plurality of openings at one side of said slideway, one thereof concentrically with the body attachment with the turret each for sustaining a tool in parallelism with the tool carried by the tool slide, guide rails on the face side of the body at opposite sides longitudinally of the slide opening for tracking a tool slide, a tool holding slide having its body recessed within said slide opening, its face side having opposite margins overlapping said rails respectively and grooved for sliding engagement therewith for confining the slide against lateral displacement, a backing plate fixed to the rear of the tool slide, marginally having a sliding bearing with the rear side of the body, the margins at the opposite ends of the backing plate formed to provide oppositely extended wings each carrying a bolt traversing the slide and having its head end accessible from the face side of the slide for compressing the wings into binding contact with the body to rigidly clamp the slide against traverse, and a feed screw carried by said body connecting with the tool slide for adjustably moving the slide.

THEODORE A. WETTIG.